United States Patent [19]

Christensen

[11] Patent Number: 5,605,502
[45] Date of Patent: Feb. 25, 1997

[54] HEAT-SHRINKABLE TUBULAR FILM MATERIAL

[75] Inventor: Knud E. Christensen, Copenhagen, Denmark

[73] Assignee: W. R. Grace & Co.-Conn., Duncan, S.C.

[21] Appl. No.: 454,883

[22] Filed: May 31, 1995

Related U.S. Application Data

[62] Division of Ser. No. 971,698, Nov. 4, 1992, which is a continuation of Ser. No. 805,242, Dec. 9, 1991, abandoned, which is a continuation of Ser. No. 527,686, May 17, 1990, abandoned.

[51] Int. Cl.$^6$ ..................................................... A22C 11/00
[52] U.S. Cl. ............................... 452/30; 452/29; 452/48
[58] Field of Search .................................. 452/30, 31, 35, 452/29, 48

[56] References Cited

U.S. PATENT DOCUMENTS

| | | | |
|---|---|---|---|
| 3,915,933 | 10/1975 | Kohno et al. | 260/47 |
| 4,263,942 | 4/1981 | Lenhault et al. | 138/109 |
| 4,479,283 | 10/1984 | Hollingsworth | 452/32 |
| 4,525,414 | 6/1985 | Ohya et al. | 428/213 |
| 4,649,601 | 3/1987 | Kollross | 452/48 |
| 4,663,170 | 5/1987 | Matthews et al. | 426/90 |
| 4,672,793 | 6/1987 | Terlizzi, Jr. | 452/48 |
| 5,045,020 | 9/1991 | Neeff et al. | 452/21 |

*Primary Examiner*—Willis Little
*Attorney, Agent, or Firm*—Mark B. Quatt

[57] ABSTRACT

In the manufacture and use of tubular casing material, a starting material having heat-shrinkable properties is partially shrunk to a controlled reduced calibre and then is further shrunk during use. The shrinking may either take place during use, for example by partially shrinking tubular film material over a stuffing horn 2 in a shrinker 6 (FIG. 1) or may be carried out during manufacture by partially shrinking a length of tubular film material to a controlled reduced calibre before sale (FIGS. 2 and 3).

1 Claim, 3 Drawing Sheets

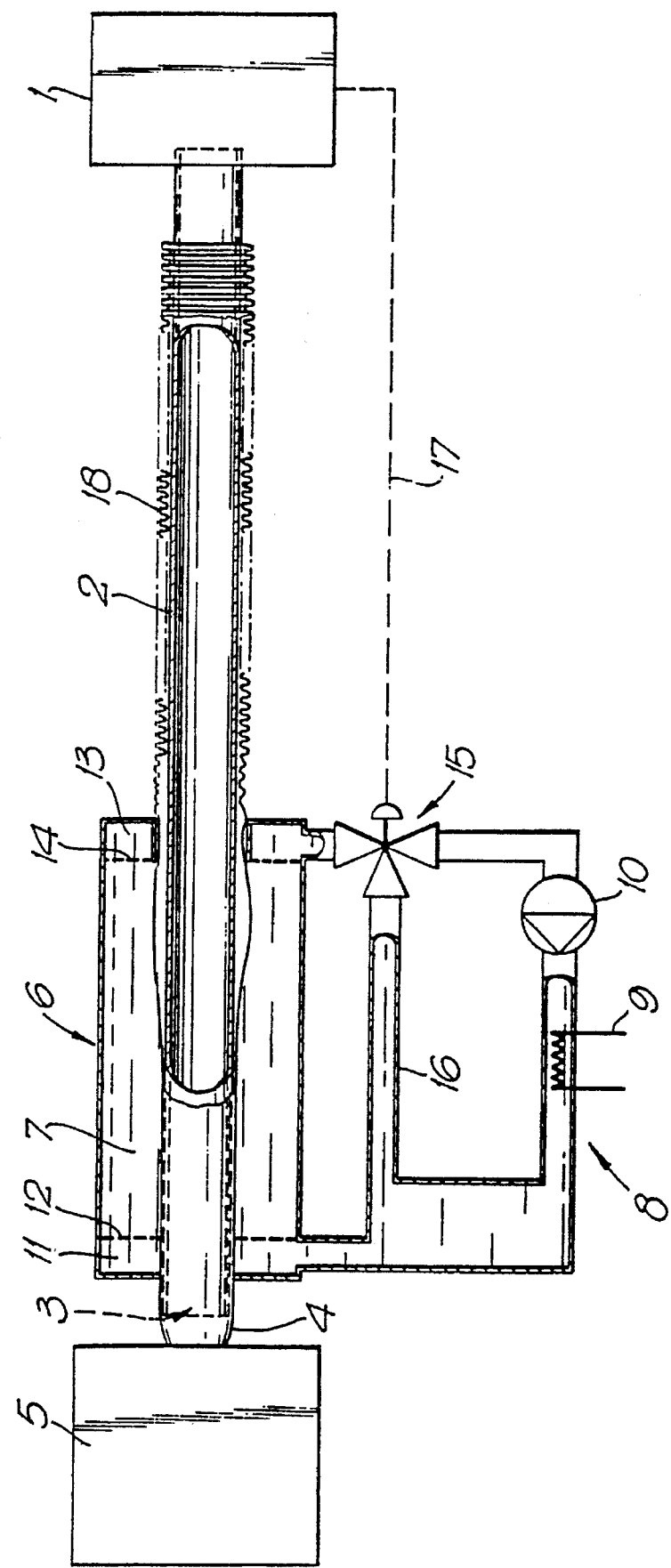

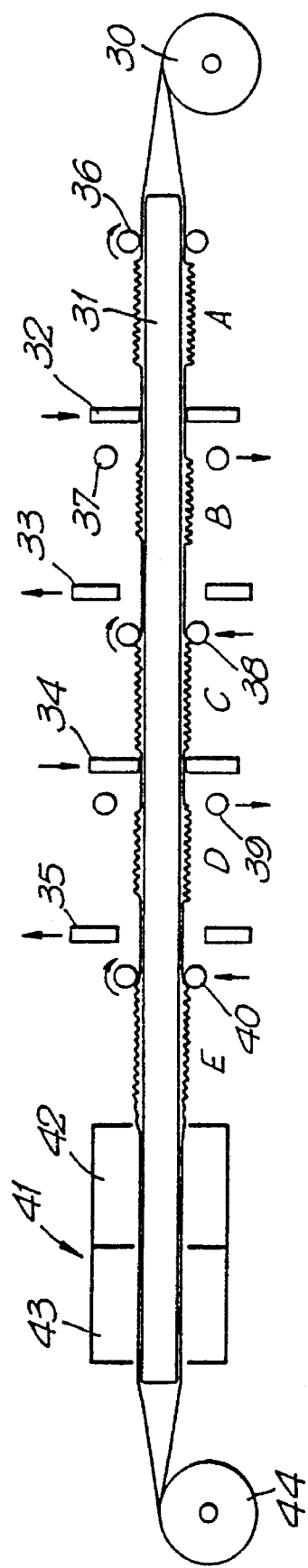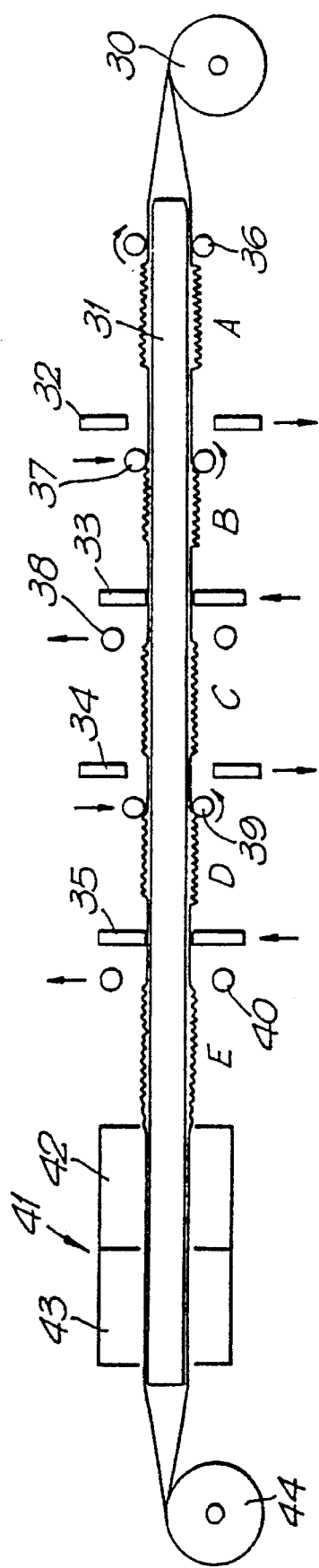

HEAT-SHRINKABLE TUBULAR FILM MATERIAL

This is a Divisional Application of application Ser. No. 971,698, filed Nov. 4, 1992, which is a Continuation Application of application Ser. No. 805,242, filed Dec. 9, 1991, now abandoned, which in turn is a Continuation Application of application Ser. No. 527,686, filed May 17, 1990, now abandoned.

The present invention relates to the manufacture and/or use of heat-shrinkable tubular film material, for example for use in the packaging field where the tubular film material forms the casing which can be closed at both ends. However, the present invention can also be employed in other applications of tubular film material.

It is known to provide heat-shrinkable tubular film material but it is also known that in the manufacture of such material it is difficult to provide tight tolerances on the diameter of the film material. For example, depending on the particular material used, the width of a flat-folded tube or tape which is nominally 150 mm in width can vary by up to plus or minus 40 mm. At best such a width may vary by plus or minus 15 mm (i.e. +10%). The difficulty arises in that rendering the tubular material heat-shrinkable involves the steps of expanding a bubble of the film material, while at its orientation temperature, and then rapidly chilling the material in that expanded form to "freeze" the memory of its original configuration into the crystalline structure of the film. Precise control of the internal pressure of the bubble, which will govern the expanded diameter of the tubular material, is difficult. Also it has been found that heat-shrinkable tubular films have a tendency to shrink back uncontrollably during the first 48 hours after orientation inflation.

Another disadvantage of known forms of heat-shrinkable tubular film material, particularly for the packaging industry, is that the material may be used to pack products of a wide range of diameters, whereas the manufacture of the shrinkable tubular material in large quantities is best achieved with a very limited number of diameters of the material, and hence it has in the past been uneconomic to produce many different sizes of the film material, bearing in mind the very expensive plant required to extrude the material in molten tubular form and then, after chilling, to carry out the bubble expansion process at orientation temperature.

It is an object of the present invention to overcome the above-mentioned disadvantages of the prior art heat-shrinkable film material.

In accordance with one aspect of the present invention there is provided a process for manufacturing and using a tubular film material comprising forming a heat-shrinkable tubular film material, partially shrinking the tubular film material onto a mandrel to alter its calibre while controlling the shrink conditions and the size of the mandrel to achieve a desired modified calibre, and then subsequently further shrinking the partially shrunk film material in use.

By recovering part of the shrink potential before final use of the heat-shrinkable film material, it is possible to achieve much more precise control of the dimensions (in particular the width of the flat-folded tubular film or tape), in that the part-shrunk material, having been shrunk onto a calibrated mandrel, has a known diameter which corresponds to the particular pre-shrinking diameter of the tubular film material appropriate for its end use. Furthermore, whereas it is difficult to guarantee any particular post-expansion diameter of the tubular film material at the end of the heat shrinkability-imparting bubble expansion process (because of the difficulty of control of the internal pressure in the bubble within very fine tolerances, and possibly as a result of uncontrolled shrink-back as mentioned earlier) the fact that the diameter is calibrated by shrinking into mechanical contact with a known size of mandrel, preferably with cooling on the mandrel, provides a much more precise control. The finished film material nevertheless has adequate residual shrink potential to allow shrinking of the tubular film material in the final use, for example for allowing the tubular film material when used as a packaging casing to be shrunk down onto the product therewithin.

The partially shrunk tubular film material may be stored in the form of shirred sticks, or rolls, or any other convenient form, for subsequent use, and sticks of different diameters are formed by differently shrinking a starting film of one nominal calibre.

By shirring the tubular casing material in its fully expanded form, when the film has its minimum thickness, it is possible to shirr the material much more tightly than hitherto, bearing in mind the diameter of the product to be packed. By "tightness" of shirring, we refer to the shirring ratio which is expressed in terms of the length of the shirred stick as a proportion of the length of the tubular film material which has been compressed into the shirred stick form.

When the tubular film material is shirred, the shirring ratio will be controlled by the film thickness and hence if as an example it is desired to provide a shirred stick which can be used to package product material which would normally require a film or tape having a flat-folded width of, for example, 90 mm, and the shirred stick is formed of a film which has a width of 150 mm, with the intention of heat-shrinking the film down to 90 mm before packing, then a much greater quantity of film material can be incorporated into the shirred stick. Bearing in mind that for stuffing casing material it is traditional to take a shirred stick of a predetermined length and to mount that around the stuffing horn at the start of each batch of product material to be stuffed, the longer the time of operation between the exchange of shirred sticks, the more economic the use of the apparatus will become. There are therefore considerable commercial advantages available with the process of the present invention.

Yet another aspect of the present invention provides apparatus for stuffing tubular casing material with a pasty product, comprising a stuffing horn, a stuffer arranged to feed pasty product material along the stuffing horn axially therethrough, and means for applying shrinking heat to tubular film material being advanced from the stuffing horn towards a stuffing location, and means for closing the tubular casing material and for severing it into discrete lengths to form packages of discrete lengths.

By heat-shrinking the tubular film material before stuffing, and by selecting an appropriate diameter of a stuffing horn and appropriate shrinking temperature, it is possible to allow one size, or only a very few different sizes, of tubular casing material to be used for packaging a wide variety of product dimensions. For example, simply by changing the diameter of the exterior of the stuffing horn portion onto which the tubular casing material is shrunk, and by changing the shrinking parameters accordingly, it is possible to achieve many different calibres for the film material at stuffing, in a way which was not readily possible in current manufacture of heat-shrinkable tubular casing material.

As a further advantage of the apparatus, it is possible to apply the shrinking heat locally at one part of the periphery of the tubular film material and hence to cause differential shrink which is particularly suitable in the manufacture of stuffed ring-shaped or "crescent-shaped" products such as certain meat sausages.

A further advantage of the apparatus of the present invention is that the diameter of the shirred stick is considerably greater than hitherto for a particular stuffing diameter and hence it is possible to allow the diameter of the stuffing horn to be greater for the majority of its upstream part, hence reducing the friction Of the material being stuffed arid allowing higher throughput rates.

In order that the present invention may more readily be understood the following description is given, merely by way of example, with reference to the accompanying drawings in which:

FIG. 1 is a side elevational view of a stuffing apparatus showing a shirred stick of tubular casing material loosely fitted around a stuffing horn and being subjected to a shrinking operation in which a part of the total shrink potential is recovered while bringing the tubular casing material down to a desired diameter appropriate for the product being fed from a stuffing unit, through the stuffing horn, to a clipping unit at which the casing material is clipped at each end and severed to form predetermined tubular products, for example meat sausages;

FIG. 2 is a side elevational view of apparatus for producing rolled tubular film material having a predetermined calibration more accurate than can be achieved with the prior art apparatus;

FIG. 3 is a view corresponding to FIG. 2 but showing the apparatus during an alternative part of its operating cycle.

Figure 4:
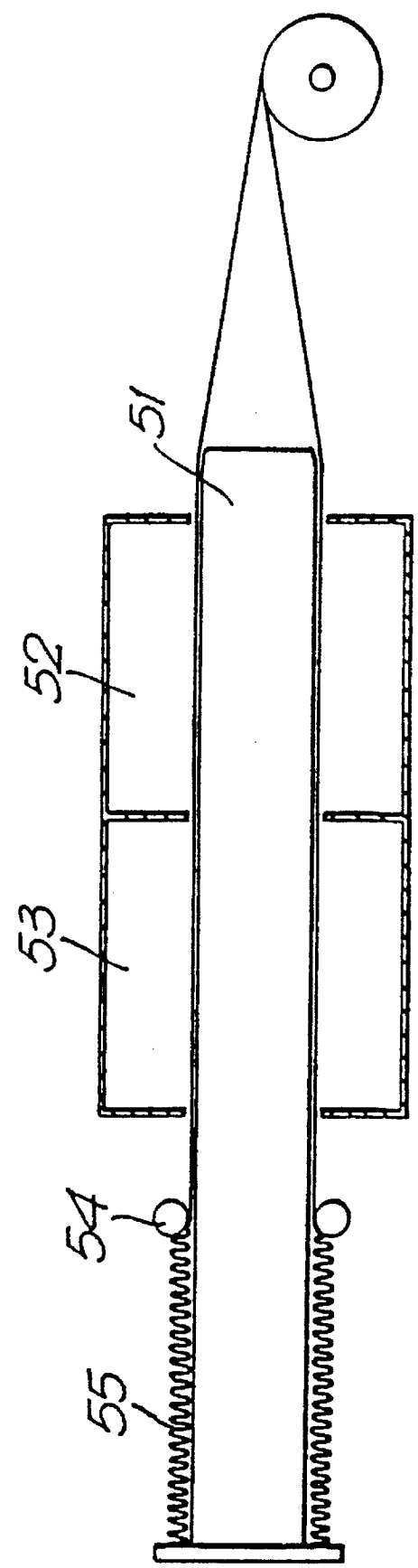
FIG. 4 is a purely schematic view showing the manufacture of the film material in shirred stick form, with an appropriate diameter for the end use required of the shirred material.

Referring now to the drawings, there can be seen from FIG. 1 a stuffing apparatus in which product material, for example meat emulsion, is advanced under pressure from a stuffing unit 1 along the interior of a stuffing horn 2 to an outlet 3 of the stuffing horn where the material enters tubular casing material 4 to urge it into a clipping unit 5 where the tubular casing material has a clip applied at its leading end and ultimately a pair of closely spaced clips at a downstream location in order to define (a) with the first-mentioned clip a stuffed tubular casing of predetermined length closed by the first clip of the pair, and (b) a leading-end clip (the second clip of the pair) for the next product.

In accordance with the present invention, the tubular film material is subjected to a partial shrinking operation in a shrinking unit 6 which uses a shrinking medium, in this case hot air, in a chamber 7 where the shrinking medium is in contact with the exterior of the film and causes it to shrink down to conform with the external diameter of the outlet portion 3 of the tubular stuffing horn 2, serving as a shrink-limiting mandrel.

As shown in FIG. 1, the shrinking unit 6 is associated with a circulation circuit 8 for the hot shrinking medium. The circuit 8 includes heating means 9 and a circulation pump 10 which normally cause the hot shrinking medium, in this case air, to enter an inlet chamber 11 having a permeable wall 12 through which the shrink medium passes into the main shrinking chamber 7. After it has carried out its shrinking operation, the cooled shrinking medium returns to the pump 10 by way of an outlet chamber 13 having a permeable wall 14 separating it from the main chamber 7, and then passes by way of a flow control valve 15.

Advantageously the shrinking medium circuit 8 includes a recycle conduit 16 communicating with the valve 15, and the valve is of three-way construction and is controlled by a schematically illustrated control line 17 connected to the stuffing unit 1. If for any reason the apparatus is stopped, for example because of an interruption at the clipping unit, the stuffing unit will sense lack of movement of the product along the stuffing horn 2 and will immediately generate a signal on the line 17 to isolate the outlet chamber 13 from the return circuit 8 and to open the recycle line 16 so that the pumped shrinking medium circulates within the "standby" circuit including the recycle line 16. As soon as product is ready to flow again, line 16 is isolated from the valve 15 and the output chamber 13 is re-opened so as to resume flow of shrinking medium through the main shrinking chamber 7 and to resume the task of shrinking the casing material.

AS shown in FIG. 1, the inlet chamber 11 and the outlet chamber 13 are both of annular construction but the outlet chamber 13 has a larger diameter at its internal wall, in order to allow the tubular casing material to expand away from contact with the adjacent external surface of the cold stuffing horn, for the purposes of allowing uniform shrink.

The use of hot air as the shrinking medium is particularly advantageous since the action of the circulating fan (pump 10) results in a reduced air pressure in the outlet chamber 13 and main shrinking chamber 7 (as compared with the atmospheric pressure between the casing and the stuffing horn) is expected to act to draw the tubular casing material radially away from the stuffing horn exterior until the transverse shrink force overcomes this pressure differential.

The advantages of the apparatus shown in FIG. 1, and of the process of packaging using this apparatus, include the fact that the tubular casing material which is provided in the form of a stick 18 having only one diameter or one of a very limited range of diameters can be shrunk to different extents dependent upon (a) the diameter of the stuffing horn outlet portion 3 which serves as a mandrel onto which the tubular casing material is shrunk, and (b) the shrink temperature imparted by the hot shrinking medium in the main chamber 7. Thus the stuffing horn portion 3 may be replaced by one of a different diameter (possibly with a change in the part of the shrinker 6 incorporating the inlet chamber 11) in order to switch from one casing calibre to another. On the other hand, this allows the expensive plant, in which the tubular casing material is manufactured and given its heat-shrinkability, to continue to produce the heat-shrinkable tubular casing material of a single nominal calibre in large quantities without needing to be shut down to vary the diameter of the material. In this way it is possible firstly to ensure that the maximum productivity of the manufacturing apparatus can be achieved, and secondly it is possible for stocks of the shirred tubular casing material 18 to be kept at a minimum since there is no need to stock various different sizes of the material when the calibre of the material at stuffing can be controlled by the end user, in this case the operator of the stuffing plant.

A further variation of the process shown in FIG. 1 is one where the tubular casing material may, without being immediately stuffed, be partially shrunk from its starting diameter to a diameter which will be appropriate for subsequent stuffing or for any other end use of heat-shrinkable tubular film material. In this process there is no need for a hollow mandrel since the partially shrunk material having been given its new, partially reduced, calibre is then shirred or rolled or pre-clipped before further use. In that event it is possible, if desired, to shrink the material by application of heat internally of the tubular film material, i.e. from within the mandrel on which the calibration operation occurs.

If desired, a hollow mandrel with the application of heat from within to achieve shrinking may be used as an alternative to FIG. 1 when stuffing during shrinking is carried out. However, the FIG. 1 arrangement, using externally applied heat, is preferred.

The present invention thus envisages not only a packaging process in which the tubular casing material is partially shrunk to a desired calibre while moving along the stuffing horn, but also the possibility of partially shrinking tubular casing material which is then either rolled or shirred, or stored in some other convenient form, before further use. The thus stored material will, of course, still retain part of its shrink potential.

As indicated above, the fact that the tubular casing material in the shirred stick 18 at the right hand end of the stuffing horn in FIG. 1 has a reduced wall thickness compared with the tubular casing material leaving the downstream end 3 of the stuffing horn 2 means that firstly the stick 18 is a much looser fit on the stuffing horn and hence the time required for replenishing the stick 18 is reduced as compared with prior art sticks, and hence a higher rate of utilisation of the stuffing unit and clipping unit can be realized. Furthermore, it is possible to derive further advantage from the use of the partial shrinking operation while stuffing, in that the same reduced wall thickness allows a much higher shirring ratio than hitherto and hence the time of utilisation of the apparatus shown in FIG. 1 between replenishment of the shirred sticks 18 is greater than hitherto, given a particular length of shirred stick 18, in that the stick in question will contain a longer length of casing material when the wall thickness is reduced than it would if the shirred stick 18 contained material which was not shrunk before stuffing.

Yet a further option is for the diameter of the inlet portion of the stuffing horn 2 around which the shirred stick 18 is placed to be increased in order to allow greater throughput of the product material. It is known that the throughput W of emulsion to be stuffed can be expressed by the relation $$W = K \times \frac{D^4 \times p^3}{L^2 \times V^3}$$

where

K=dimensional constant

D=horn inside diameter,

P=stuffing pressure,

L=horn length,

V=emulsion viscosity,

As can be seen, the important parameters of the stuffing horn and their effect on the efficiency of the stuffing operation are that the throughput varies directly as the fourth power of the internal diameter of the stuffing horn and inversely as the square of the length of the stuffing horn. By ensuring that along most of its length the stuffing horn has a larger diameter than is appropriate at the downstream end 3, the throughput of material can be increased, allowing more economic use of the stuffing apparatus 1, 2, 5.

It will of course be understood that a stuffing horn should accept the maximum possible length of shirred stick but nevertheless have its overall length kept to a minimum in order to optimize the throughput rate, so the shrink unit 6 of FIG. 1 should be kept as short as possible in the axial direction. It may be, for example, that the length can be reduced by using a higher thermal capacity shrink medium, for example hot water or any other hot liquid.

It will of course be appreciated that during use of the apparatus shown in FIG. 1 it is important for the rate of advance of the film material to be carefully controlled through the shrinking unit 6 so that the dwell time is adequate to achieve the desired degree of shrinking. This will of course depend on the rate of advance of the meat emulsion being stuffed into the casing since it is the advance of this emulsion which effects, and hence controls, the rate of advance of the tubular casing.

Furthermore, to obtain loosely or tightly stuffed product, the resistance to movement of the tubular casing material 4 leaving the downstream end 3 of the stuffing horn 2 must be controlled and traditionally this control is effected by use of an external friction brake which resists movement of the casing material. However, in accordance with the present invention the fact that the tubular casing material is being shrunk down into contact with the outlet portion 3, which itself serves as a calibrating mandrel to control the calibre of the finished casing material, means that friction is generated and this reduces the need for braking with the traditional external casing brake. This is particularly advantageous when using externally printed tubular casing material because the traditional friction brake has been known to mar the printing whereas the use of the interior of the tubular casing material as the braked surface avoids this problem.

Furthermore, the fact that the tubular casing material is being shrunk down into contact with the outlet portion 3 to exactly the same dimension means that it is expected to form a better seal preventing air from entering through the inside of the casing and the stuffing horn 3 into the package. This can be a problem when using the traditional casing brake, as the casing material is of larger dimensions than the stuffing horn and thus forms folds through which air can enter the package, particularly during the production of loosely stuffed packages.

In the apparatus shown in FIG. 1, longitudinal shrink is prevented by a brake (which is not shown in the drawing but which could readily be devised by the man in the art).

A possible variation of the apparatus shown in FIG. 1 is one in which the main chamber 7 is located only on one side of the stuffing horn and where also controlled longitudinal shrink is performed, and thus the rectilinear shaped tubular casing is converted on the stuffing horn into a non-rectilinear shaped tubular casing for ring-shaped products.

EXAMPLE

In order to test the feasibility of partially recovering the shrink potential of the film during manufacture or during stuffing, we carried out tests involving taking a pre-stretched heat-shrinkable tubular film material and then partially shrinking it to varying extents, whereupon its flat-folded width was measured. A first sample of heat shrinkable tubular BT-1 material (a multi-layer laminate of polypropylene copolymer/EVA/barrier layer available from W. R. Grace & Co.) having a flat width of 152 mm and a film thickness o 55 microns was heat shrunk, using hot water, and then cooled in the shrunk form, under various conditions. The temperature of the hot water is given in the first column of Table I.

The tube width and film thickness values in the second column of Table I show the final values when all the free shrink was recovered in one step.

A second sample of the same BT-1 film was then shrunk, at the same set of hot water temperatures, in a two stage operation in which the first stage used a mandrel to limit the diameter reduction upon shrink. The values of tube width and film thickness in mm and microns, respectively, are given in the third column of Table I.

The tube width and film thickness values upon completion of the second stage of shrinking, when all available free shrink was recovered, are shown in the fourth column.

TABLE 1

| TEMPERATURE | FREE SHRINK TO WIDTH, THICKNESS | SHRUNK ON MANDREL TO WIDTH, THICKNESS | RESIDUAL SHRINK TO WIDTH THICKNESS |
| --- | --- | --- | --- |
| 80° C. | 116 mm<br>85 microns | 139 mm<br>60 microns | 116 mm<br>85 microns |
| 89° C. | 103 mm<br>120 microns | 139 mm<br>60 microns<br>125 mm<br>67 microns | 103 mm<br>120 microns<br>103 mm<br>120 microns |
| 100° C. | 87 mm<br>165 microns | 139 mm<br>61 microns<br>125 mm<br>67 microns<br>94 mm<br>89 microns | 88 mm<br>165 microns<br>88 mm<br>165 microns<br>87 mm<br>165 microns |

The above tests were then carried out with a tube of BC-1 (a multi-layer laminate of ionomer/EVA/barrier layer also available from W. R. Grace & Co.) of the same thickness but having a flat tube width of 155 mm. The shrinking steps were performed under the same shrink conditions. The results are shown in Table 2.

TABLE 2

| TEMPERATURE | FREE SHRINK TO WIDTH, THICKNESS | SHRUNK ON MANDREL TO WIDTH, THICKNESS | RESIDUAL SHRINK TO WIDTH THICKNESS |
| --- | --- | --- | --- |
| 80° C. | 122 mm<br>80 microns | 139 mm<br>61 microns | 120 mm<br>80 microns |
| 89° C. | 117 mm<br>110 microns | 139 mm<br>61 microns<br>125 mm<br>68 microns | 117 mm<br>110 microns<br>117 mm<br>110 microns |
| 100° C. | 76 mm<br>190 microns | 139 mm<br>61 microns<br>125 mm<br>68 microns<br>94 mm<br>91 microns | 76 mm<br>190 microns<br>76 mm<br>190 microns<br>76 mm<br>190 microns |

The results show that with both materials the same total free shrink can be recovered with the single stage free shrinking operation as with the mandrel/free shrink two stage operation. This applies for various extents of the initial shrink operation; in each test the diameter of the tubular film material at the end of the process has substantially attained the diameter which it would have attained if a single shrinking operation had been carried out to recover all the free shrink potential.

Although the present invention has been exemplified so far in terms of a heat-shrinkable tubular casing material, it will of course be understood that heat-shrinkable tubular film material has many end uses which do not necessarily require the clipping operation and stuffing of the material with a pasty product such as a meat emulsion or other food product. For example, the precise control of the calibre of the tubular material may be useful in the manufacture of packaging bags of heat-shrinkable material where the partially shrunk tubular film material may subsequently be used to manufacture bags.

Other end uses such as shrinkable sleeves for sealing the exterior of an article such as a jointed electrical conductor assembly may be improved by use of the present invention to control the calibre of the tubular material.

As indicated above, the possibility of controlling the calibre of tubular film material by starting with a heat-shrinkable material and then recovering part of its shrink potential while shrinking onto a known mandrel has the advantage of considerably improving the quality of product leaving the manufacturing plant. In this case, there is no need for a hollow stuffing horn which of necessity operates in batch-wise manner because of the problem of introducing the stuffing material into the interior of the tubular material and hence the process may be carried out continuously on an endless run of tubular film material.

One plant arrangement for this process is illustrated in FIGS. 2 and 3 where a supply roll 30 of tubular film material feeds the material to the right hand end of a forming mandrel 31. It will of course be understood that the supply roll 30 will normally need to be changed once one roll has been depleted, and that instead it is possible for the apparatus to be fed from the downstream end of continuous tube production plant involving extrusion with subsequent cooling, hot bath and racking stages to achieve the orienting bubble stretching operation.

In order to operate continuously on the tubular film material, the apparatus shown in FIG. 2 has four sets of clamping blocks 32, 33, 34 and 35. These sets of clamping blocks operate in pairs so that, as shown in FIG. 2, while the sets of blocks 32 and 34 are closed onto the mandrel 31 to support it both longitudinally and transversely (i.e. to carry its weight) the other sets of blocks 33 and 35 can be released. FIG. 3 shows that in an alternative part of the cycle the sets of blocks 32 and 34 are released while the sets of blocks 33 and 35 carry the mandrel.

Associated with the mandrel are various film advancing roller sets 36, 37, 38, 39 and 40. The action of these roller sets is to form various shirred locations at A, B, C, D and E along the mandrel, and to advance film from one such shirred location to the next in a predetermined sequence.

In FIG. 2, while the sets of clamping blocks 32 and 34 are closed the feed roller sets 36, 38 and 40 are each advancing material into the immediately downstream shirred build-up A, C and E. The roller set 36 is taking film from the supply roll 30 whereas the roller sets 38 and 40 are taking film from the preceding shirred build-ups B and D, respectively.

As shown in FIG. 2, while the roller sets 36, 38 and 40 are operating the intervening roller sets 37 and 39 are inoperative.

Once the build-ups B and D have been depleted or substantially depleted, the operating state of the sets of blocks 33 and 35 is changed to hold the mandrel whereupon the other sets of blocks 32 and 34 can be operated to release the mandrel. At the same time the roller sets 38 and 40 stop operating while the rollers 37 and 39 begin to operate to rebuild the shirred build-ups B and D which were depleted during the preceding phase. In doing so they in turn deplete the shirred build-ups A and C which were formed by the rollers 36 and 38 during the preceding phase.

As can be seen from FIGS. 2 and 3, the upstream advancing roller set 36 remains in contact with the mandrel at all times to maintain a substantially constant rate of paying out of the film material from the supply roll 30 (or in other words a substantially constant rate of advance of the film material from any other supply source). Likewise, the build-up E is all the time being depleted by the heat shrinking operation carried out at the shrinking unit 41 which has a heating chamber 42 followed by a cooling chamber 43 to effect the necessary partial shrinking and subsequent cooling of the tubular film material once the desired calibre has been attained by shrinking it onto the downstream or left hand end of the mandrel 31.

It will of course be understood that the shrinking unit 41 of FIGS. 2 and 3 may operate in substantially the same way as the shrinking unit 6 shown in FIG. 1, although it has been modified by the addition of a special cooling stage.

The need for a cooling stage in the apparatus of FIG. 1 is not acute since the relatively low temperature of the meat emulsion being pumped from the stuffing unit into the clipping unit will keep the downstream end of the stuffing horn 3 cool. Because of the lack of any flow of cooling material through the interior of the mandrel 31 in FIGS. 2 and 3, an external cooling stage 43 is advantageous if not essential.

At the downstream end of the apparatus of FIGS. 2 and 3 is a film winding unit 44 to take-up the now slightly shrunk film material having a much tighter tolerance of calibre. However, it will of course be understood that the winding unit 44 may be followed by, or replaced by, a shirring unit to supply shirred sticks of tubular film material having this more precisely controlled calibre.

Various other possibilities exist for locating the mandrel 31 in the apparatus where the shrinking unit is operating on a continuous or semi-continuous basis and it will therefore be realized that one such system has been illustrated in FIGS. 2 and 3 by way of example.

FIG. 4 shows very schematically a variation of FIG. 2 in which the partially shrunk tubing from the shrinking chamber 52 is cooled at 53 and then shirred by rollers 54 to form a stick 55 for storage and then delivery to a stuffing plant. The mandrel 51 is held in place by means which are not shown in the drawing but which could readily be devised by the man in the art.

I claim:

1. Apparatus for manufacturing heat-shrinkable tubular film material including a mandrel, means for feeding tubular film material onto one end of the mandrel, means further from said one end of the mandrel for applying shrinking heat to the tubular film material to shrink it into contact with the mandrel, giving it a precise modified calibre; and sets of clamping members for supporting the mandrel, said clamping members being driven in alternation so that some of the clamping members are operative while others are inoperative to allow the heat-shrinkable tubular film material being processed to pass from one side of the released clamping members to the other, followed by reversal of the operating states of the clamping members to allow the advance of the tubular film material to proceed on a continuous basis.

\* \* \* \* \*